United States Patent [19]
Asai

[11] Patent Number: 4,820,012
[45] Date of Patent: Apr. 11, 1989

[54] ELECTRIC WIRE

[75] Inventor: Masaki Asai, Nagoya, Japan

[73] Assignee: Kabushiki Kaisha MEC Laboratories, Nagoya, Japan

[21] Appl. No.: 116,301

[22] Filed: Nov. 4, 1987

[30] Foreign Application Priority Data

Nov. 14, 1986 [JP] Japan .................. 61-272317

[51] Int. Cl.[4] .................. G02B 6/44; H01B 5/10
[52] U.S. Cl. .................. 350/96.23; 174/113 C; 174/131 A; 219/209
[58] Field of Search .......... 174/113 C, 131 A; 219/209; 350/96.23

[56] References Cited

U.S. PATENT DOCUMENTS

| 1,880,060 | 9/1932 | Wanamaker | 174/113 C |
| 2,193,429 | 3/1940 | McConnell | 174/131 A |
| 2,450,429 | 10/1948 | Henning | 174/113 C |
| 2,458,243 | 1/1949 | Biddle | 174/131 A |
| 2,676,305 | 4/1954 | Fondiller | 219/209 X |
| 2,941,176 | 6/1960 | Jacoby | 174/113 C |
| 3,453,374 | 7/1969 | Natwick | 174/113 C |
| 3,717,720 | 2/1973 | Snellman | 174/131 A |
| 4,374,608 | 2/1983 | Anderson | 350/96.23 |
| 4,445,593 | 5/1984 | Coleman et al. | 174/113 C X |
| 4,457,583 | 7/1984 | Mayr et al. | 350/96.23 |
| 4,479,702 | 10/1984 | Pryor et al. | 350/96.23 |

FOREIGN PATENT DOCUMENTS

| 1024228 | 7/1975 | Canada | 174/70 A |
| 2263713 | 7/1974 | Fed. Rep. of Germany | 174/131 A |

Primary Examiner—Morris H. Nimmo
Attorney, Agent, or Firm—Armstrong, Nikaido, Marmelstein & Kubovcik

[57] ABSTRACT

An electric wire having an insulating core rope made of aromatic polyamide fiber, an electric insulating intermediate layer of high heat resistant material which covers the electrical insulating core and an outer conductor which surrounds the intermediate core and is composed of wound conductive wires, elongated conductive pieces or a single bent plate. A pipe which may contain an optical fiber may be embedded in the core and the insulating core may include a heat generator located therein.

7 Claims, 3 Drawing Sheets

ELECTRIC WIRE

BACKGROUND OF THE INVENTION

1. Field of the Invention

The present invention relates to an electric wire and more precisely it relates to an insulated bare wire.

2. Description of the Related Art

In order to string a conventional electric wire between poles or steel towers in the air, it is necessary to hang the electric wire from a stranded steel wire which is located on the side of the electric wire. This stranded steel wire is, however, heavy and must be attached to poles or steel towers through insulators.

The primary object of the present invention is to provide a novel electric wire which is contrary to the prejudice in which the stranded steel wire is considered absolutely necessary for stringing the electric wire in the air.

Namely, the present invention aims at the realization of a new electric wire which has a core rope therein which is adapted to string the electric wire between the poles or steel towers, so that no stranded steel wire is needed.

That is, the primary object of the present invention is to provide an electric wire which need not be a stranded steel wire when the electric wire is strung in the air.

Another object of the present invention is to provide an electric wire which can realize a light stringing arrangement, in comparison with a conventional stringing construction in which a support, such as a pole or a steel tower is subject to a heavy load by the heavy stranded steel wire for hanging the electric wire.

Still another object of the present invention is to provide an electric wire which can be connected to another electric wire or pole or steel tower without using an insulator.

Another object of the present invention is to provide an electric wire which can easily form a particular electric wire having an optical fiber or a heat generator or the like in a core thereof.

SUMMARY OF THE INVENTION

To achieve the objects mentioned above, according to the present invention, there is provided an electric wire comprising an insulating core rope, a heat insulating layer which covers the core rope, and an outer conductor which surrounds the heat insulating layer.

With this arrangement, the core rope can be used to hang the electric wire from the support, such as a pole or steel tower, so that no stranded steel wire for hanging is needed. When the electric wires are interconnected or attached to the support, the outer conductors are partially separated from the core rope, so that the conductors can be prevented from coming into contact with other elements, so that insulators can be dispensed with.

BRIEF DESCRIPTION OF THE DRAWINGS

The invention will be described below in detail with reference to the accompanying drawings, in which;

In FIGS. 1 to 3, the electric wire 10A, 10B or 10C has an insulating core rope 11, a heat and electrical insulating layer 12 which covers the outer periphery of the core rope 11, and an outer conductor 13A, 13B or 13C which surrounds the intermediate layer 12.

The core rope 11 is preferably made of a fiber rope of polyester fiber or the like. As a material of which the core rope 11 is made can be advantageously used aromatic polyamide fiber (aramid fiber) or glass fiber, which is relatively light and has a large tensile strength and a small ductility. The core rope 11 is preferably formed by a bundle of fibers extending in substantially parallel with each other without being stranded, so that the rope has a high resistance to the extension or elongation thereof (small ductility).

The heat insulative intermediate layer 12 is preferably made of fluorocarbon resin or the like. The intermediate heat insulating layer 12 can be realized by a fluorocarbon resin tape or other heat insulating tape which is available on the market and which is wound on the core rope 11 in practice.

Figure 1A:
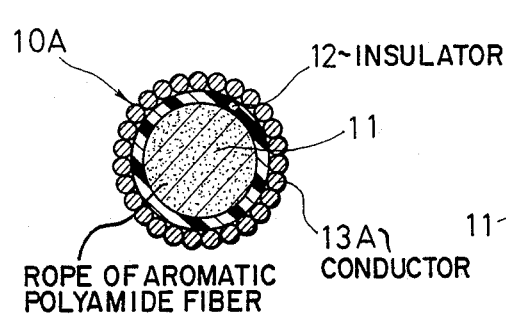
FIGS. 1(A) and 1(B) are cross sectional view and side elevational view of an electric wire according to one aspect of the present invention, respectively.
Figure 1B:
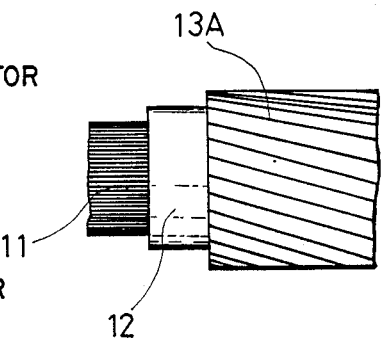
Figure 2A:
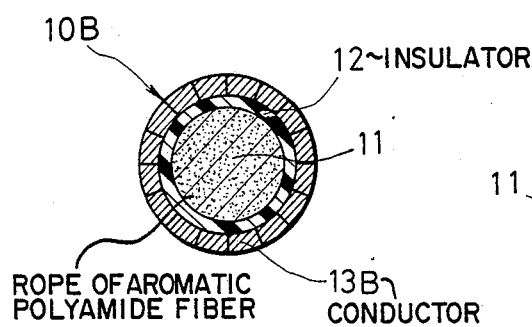
FIGS. 2(A) and 2(B) are views similar to FIGS. 1(A) and 1(B), according to another aspect of the present invention, respectively.
Figure 2B:
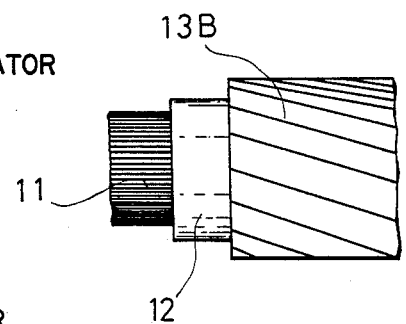
Figure 3A:
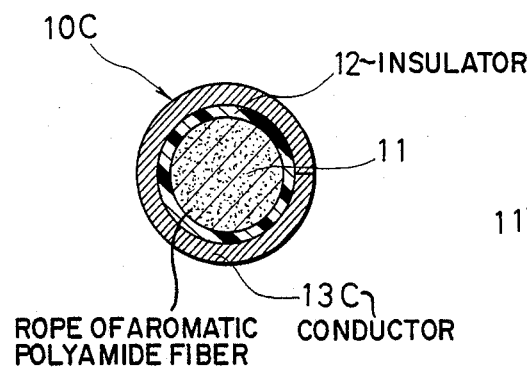
FIGS. 3(A) and 3(B) are views similar to FIGS. 1(A) and 1(B), according to still another aspect of the present invention, respectively.
Figure 3B:
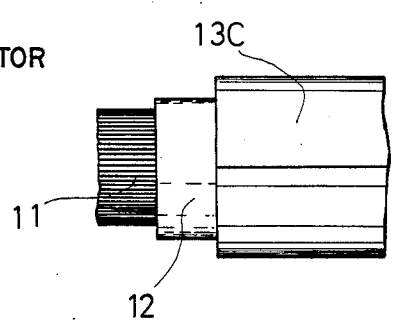

There are different types of conductors 13A, 13B and 13C, as shown in FIGS. 1 to 3. In FIGS. 1(A) and 1(B), the conductor 13A is made of copper or aluminum wires which are wound on the intermediate layer 12. In FIGS. 2(A) and 2(B), the conductor 13B is made of plate like wires (conductive elongated pieces) which surround the intermediate layer 12 and which forms a tubular layer. In FIGS. 3(A) and 3(B), the conductor 13C is made of a single tubular plate surrounding the intermediate layer 12.

Figure 4:
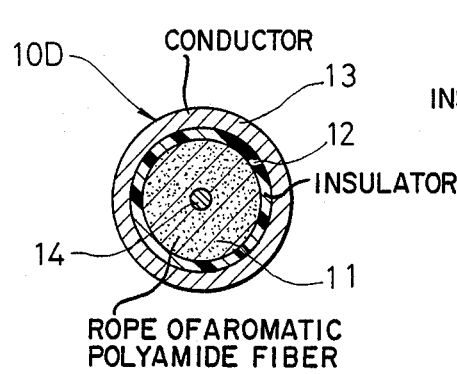
FIG. 4 is a cross sectional view of an electric wire according to the present invention, in which a heat generator is provided in a core rope of the electric wire.
Figure 5:
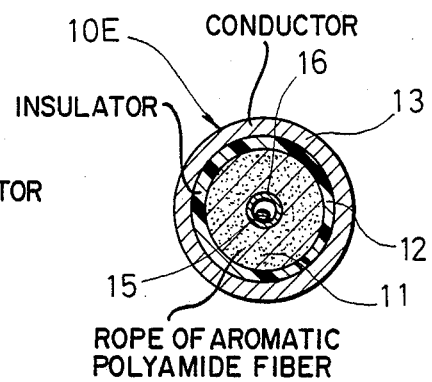
FIG. 5 is a cross sectional view of an electric wire according to another embodiment of the present invention, in which an optical fiber is provided in a core rope of the electric wire.

FIGS. 4 and 5 show two different embodiments of the present invention. In FIG. 4, the electric wire 10D has a heat generating wire 14 which is embedded in the core rope 11. The electric wire 10E shown in FIG. 5 has an optical fiber 15 which is inserted in an aluminum pipe (tube) 16 which is in turn embedded in the core rope 11. In FIGS. 4 and 5, numeral 13 designates the outer conductor. The embodiment illustrated in FIG. 4 is useful to melt snow which may be applied to the electric wire.

Figure 6:
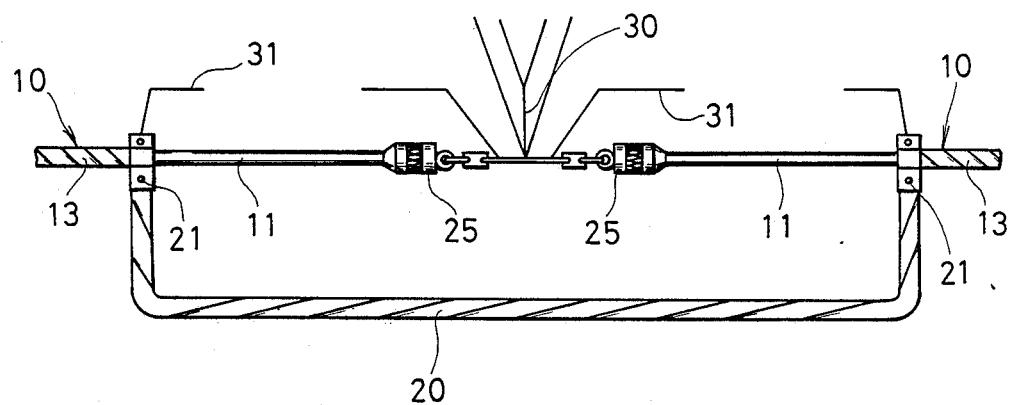
FIG. 6 is a schematic plan view of a stringing arrangement in which an electric wire is attached to a steel tower.

FIG. 6 shows how to string the electric wire 10, according to the present invention.

In FIG. 6, the electric wires 10, 10 are anchored to the steel tower 30 and the conductors 13, 13 are connected by means of a jumper 20. As can be seen from FIG. 6, the cores 11 and the conductors 13, of the electric wires 10 are separated from each other. Namely, the conductors 13 and the intermediate layers 12 are removed at the opposite ends of the electric wires to be interconnected to expose the cores 11 which are anchored to the steel tower 30 by anchoring joints 25, 25. The conductors 13 of the electric wires 10 are connected to the jumper 20, by means of terminal clamps 21 so as not to contact the steel tower 30. Reference numeral 31 designates arcing horns.

Figure 7:
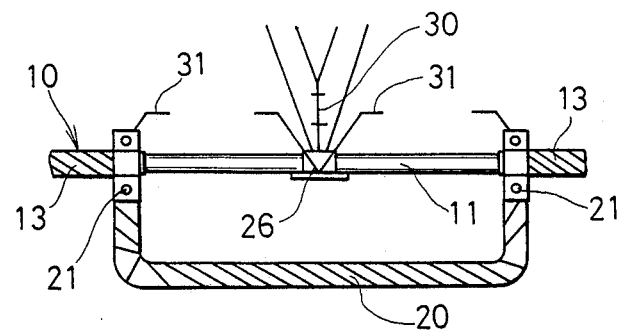
FIG. 7 is a plan view of another stringing arrangement in which an electric wire is attached to a steel tower; and, FIG. 8 is a side view of an electric wire which hangs from a hanging stranded steel wire.

FIG. 7 shows another arrangement of the connection of the electric wires according to the present invention.

In FIG. 7, the electric wires 10, 10 are hung from the steel tower 30 by means of a clamp 26. Similar to FIG. 6, the conductors 13 and the intermediate layers 12, located in the vicinity of the opposite ends of the electric wires 10, 10 to be interconnected are removed to expose the cores 11. After that, the conductors 13 are connected to the jumper 20 through the respective terminal clamps 21 so as not to contact with the steel tower 30.

Figure 8:
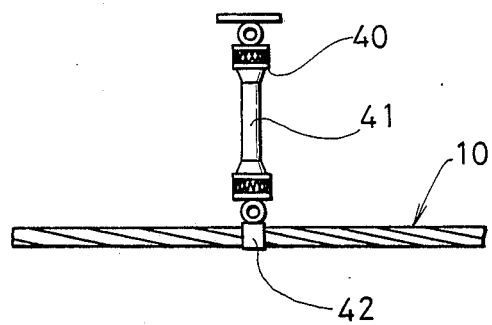

In FIG. 8 which shows a variant of FIG. 7, the electric wire 10 is clamped by a clamp 42 which is secured to a hanging rope 40 having an insulating portion 41.

As can be understood from the foregoing, according to the present invention, since the electric wire itself has a core rope incorporated therein, no separate steel wire for hanging the electric wire needs, unlike the prior art, and accordingly the electric wire can be strung without an additional hanging member. No need of hanging stranded steel wire makes it possible to easily string the electric wires and to realize a light stringing construction. This results in a decreased load exerted on the poles or steel towers. The decreased load enables the span between the poles or steel towers to be increased, resulting in a decreased number of poles or steel towers. For instance, the span of the poles which is usually 200–300 m can be increased to about 500 m according to the present invention.

In addition to the foregoing, according to the present invention, the electric wires can be connected to each other or to the poles or the like without insulators which have been considered absolutely necessary in the prior art. This contributes to inexpensive wire stringing operation and inexpensive wire transportation and maintenance.

Finally, according to the present invention, it is possible to insert an optical fiber or a heat generator in the core of the electric wires, and accordingly, an electric wire having a special purpose or usage can be easily produced.

I claim:

1. An electric wire comprising an electrical insulating core rope made of aromatic polyamide fiber, an electrical insulating intermediate layer which covers the electrical insulating core, and an outer core conductor which surrounds the intermediate layer, said outer conductor being composed of conductive elongated pieces which are located on the intermediate layer to form a tubular layer.

2. An electric wire comprising an electrical insulating core rope made of aromatic polyamide fiber, an electric insulating intermediate layer which covers the electrical insulating core, and an outer conductor which surrounds the intermediate layer, said outer conductor being composed of conductive wires which are wound on the intermediate layer to form a tubular layer.

3. An electric wire comprising an electrical insulating core rope made of aromatic polyamide fiber, an electrical insulating intermediate layer which covers the electrical insulating core, and an outer conductor which surrounds the intermediate layer, said outer conductor being composed of a single conductive plate which is bent to form a tubular layer on the intermediate layer.

4. An electric wire according to claim 1, 2 or 3 wherein said intermediate layer is made of a material having a high heat resistance.

5. An electric wire according to claim 1, 2 or 3 further comprising a heat generator located in the isulating core.

6. An electric wire according to claim 1, 2 or 3 wherein said insulating core has a pipe embedded therein.

7. An electrical wire according to claim 6, further comprising an optical fiber located in the pipe.

* * * * *